Aug. 22, 1961 L. Q. HINES 2,997,114
PEANUT HARVESTER
Filed July 15, 1959 5 Sheets-Sheet 2

INVENTOR
LLOYD Q. HINES

Aug. 22, 1961 L. Q. HINES 2,997,114
PEANUT HARVESTER
Filed July 15, 1959 5 Sheets-Sheet 4

INVENTOR
LLOYD Q. HINES

Aug. 22, 1961 — L. Q. HINES — 2,997,114
PEANUT HARVESTER
Filed July 15, 1959 — 5 Sheets-Sheet 5

INVENTOR
LLOYD Q. HINES

United States Patent Office 2,997,114
Patented Aug. 22, 1961

2,997,114
PEANUT HARVESTER
Lloyd Q. Hines, P.O. Box 5, Suffolk, Va.
Filed July 15, 1959, Ser. No. 827,253
8 Claims. (Cl. 171—116)

This invention relates to a peanut harvesting machine.

The harvesting of peanuts by machine presents problems not encountered in the growing and harvesting of any of the other common crops. Since the peanut at the time of harvesting grows beneath the ground, it must first be dug from the ground. Unlike the root crops such as sugar beets, the peanut is attached to an extensive vine structure. Unlike the potato, which is also attached to a vine structure, the peanut is much less bulky than the potato. It is impractical, at the time of digging, to separate the peanuts from the vines. Hence, it is important to retain the peanuts on the vines, to prevent their loss when the vines are subsequently collected for threshing.

Existing devices are known for this purpose; compared with such devices, my invention is characterized by its ability to dig and harvest two rows of peanuts at a high rate of speed. The machine is provided with adjustments to allow for the growing habits of different varieties of peanuts and the planting practices made necessary for variations in climate and soil. Operation at higher speeds increases the tendency of the vines to become entangled in the moving parts of the mechanism, hence I have taken special pains to overcome this condition.

A preferred embodiment of my invention is disclosed in the accompanying drawings wherein.

Figure 1:
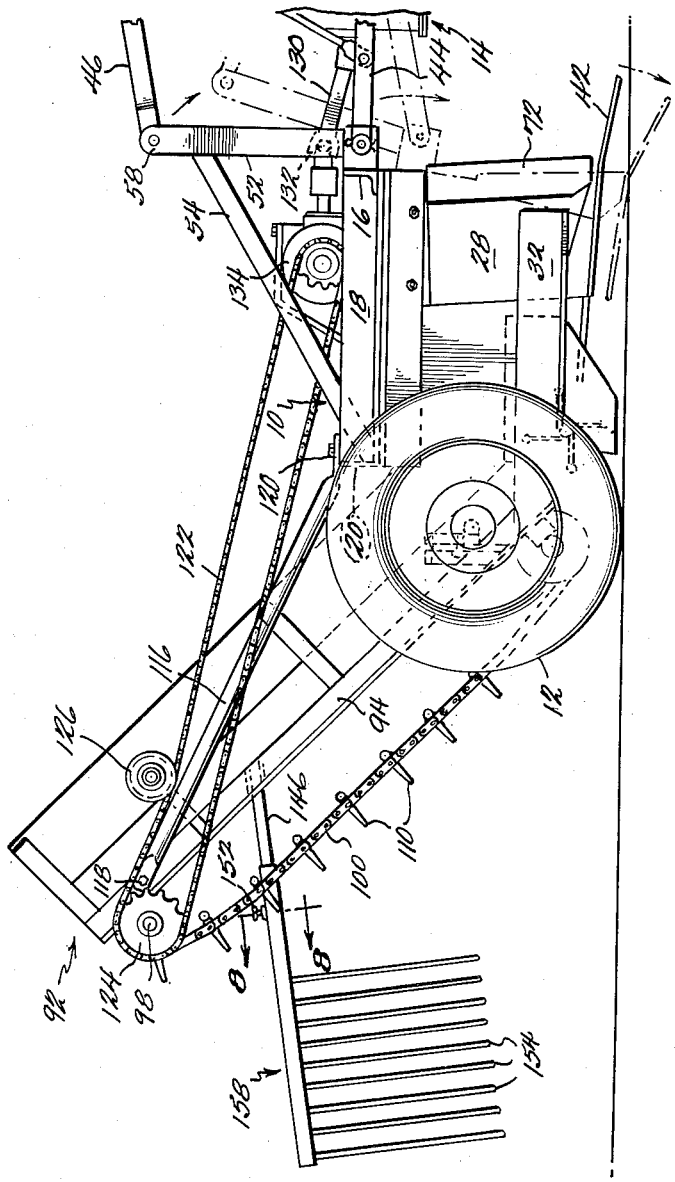
FIGURE 1 is a side view of the invention, showing the device in non-digging position; the phantom lines at the right of the figure show portions of the device in digging position.
Figure 2:
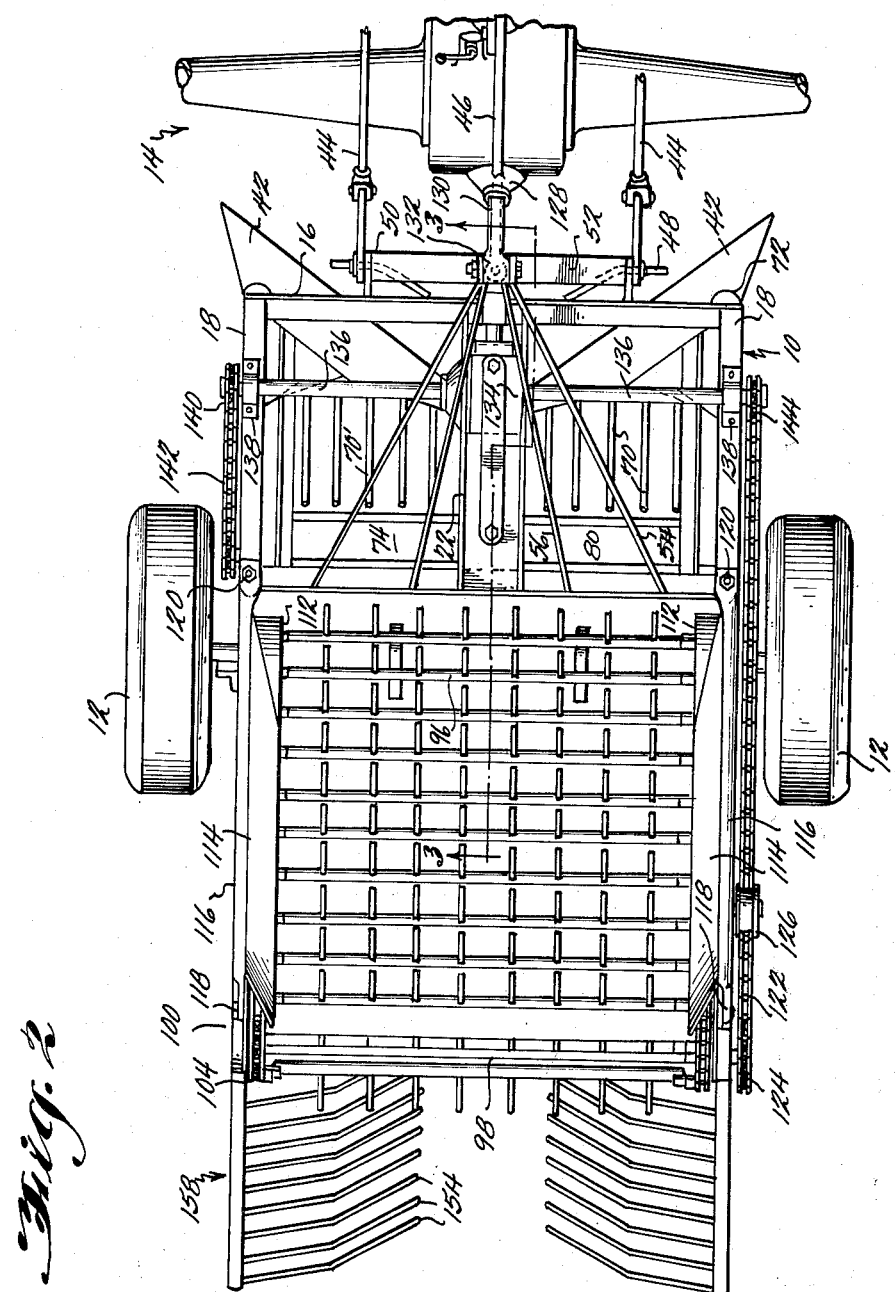
FIGURE 2 is a plan view corresponding to FIGURE 1 with additional portions of the tractor used for pulling the device.
Figure 3:
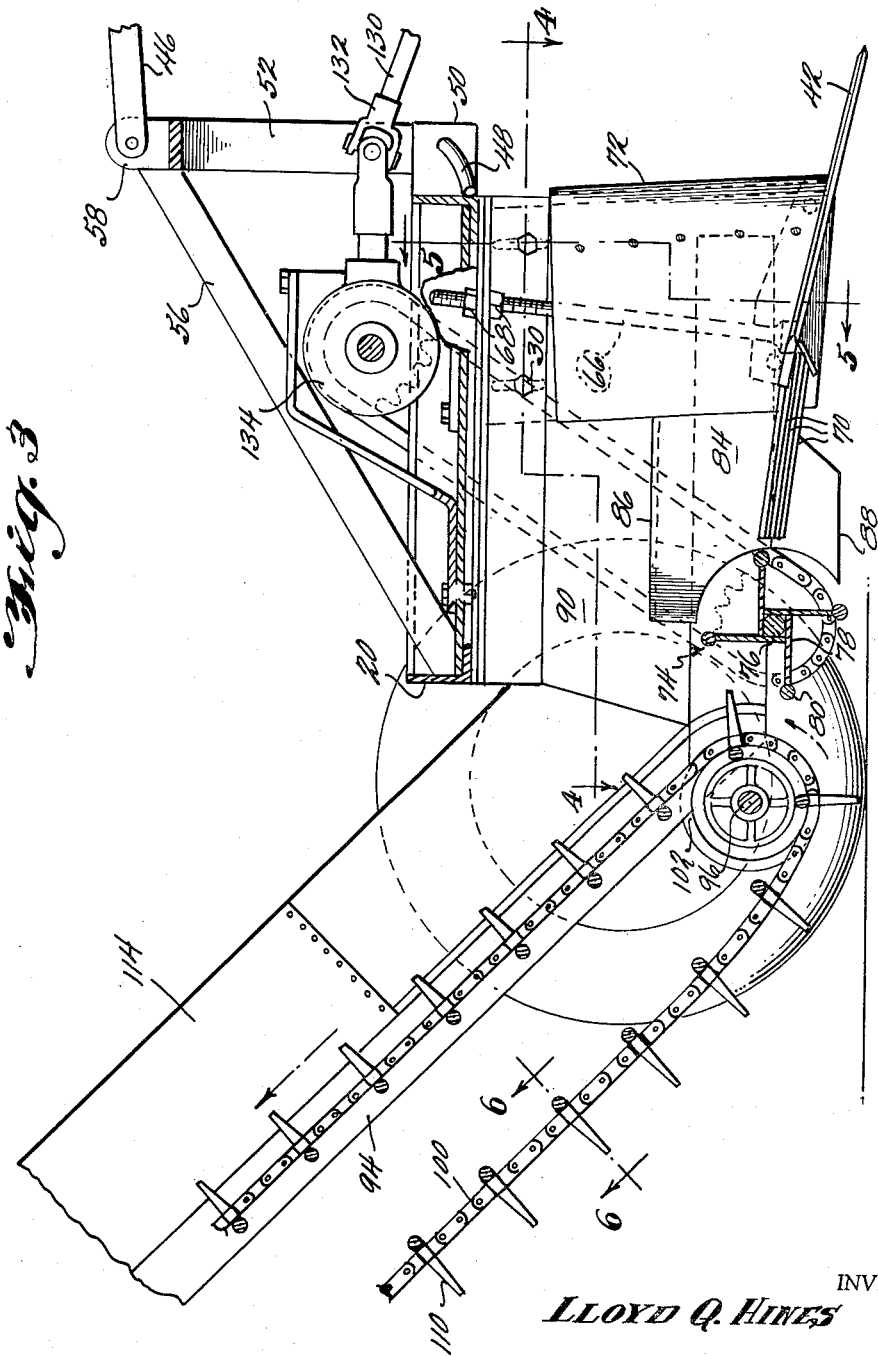
FIGURE 3 is a somewhat enlarged side view, partly in section along the line 3—3 of FIGURE 2.
Figure 4:
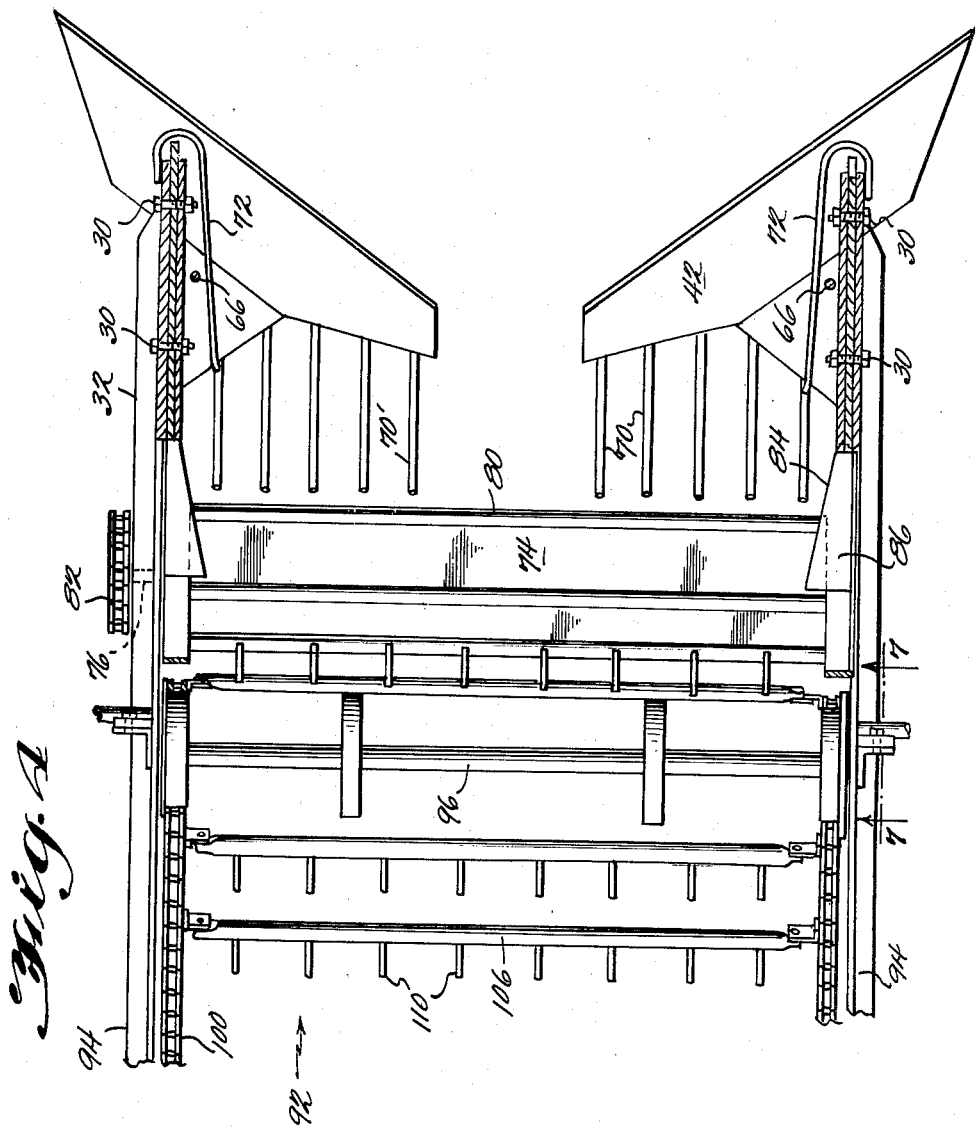
FIGURE 4 is an enlarged plan view, partly in section, the section being taken along the line 4—4 of FIGURE 3, certain parts being omitted for the sake of clarity.
Figure 5:
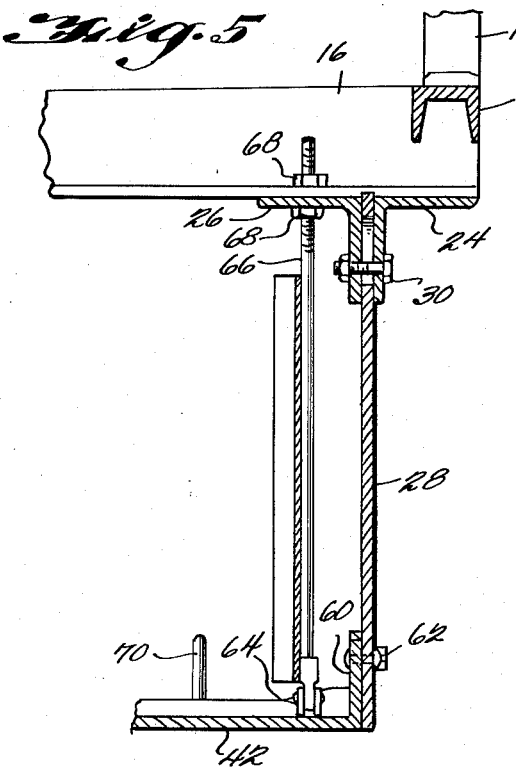
FIGURE 5 is a detail section, taken along the line 5—5 of FIGURE 3.
Figure 6:
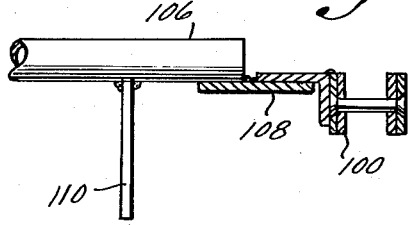
FIGURE 6 is a detail section taken along the line 6—6 of FIGURE 3.
Figure 8:
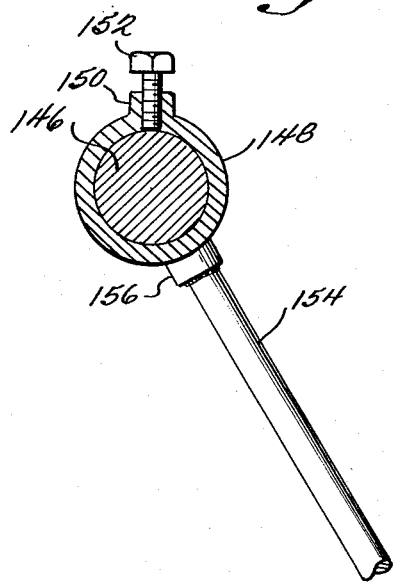
FIGURE 8 is a detail section taken along the line 8—8 of FIGURE 1.
Figure 7:
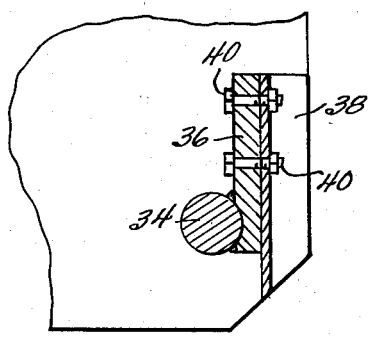
FIGURE 7 is a detail section taken along the line 7—7 of FIGURE 4.

As shown in the drawings, the device has a vehicle frame 10 mounted upon a pair of wheels 12 and drawn by a tractor, parts of which are shown at the right of FIGURES 1 and 2 and designated generally by the numeral 14. The frame 10 has a top portion made up of a forward angle bar 16 welded to two inverted side channels 18 which are in turn welded to a rear angle bar 20. Also extending from front to rear is an intermediate built up plate 22. At each side, below the channels 18, are a pair of angle irons 24 and 26. To the depending legs of these is bolted a heavy side plate 28 by means of bolts 30. Extending rearwardly along the side plates 28 are a pair of angles 32, welded to said plates. A number of other bracing and framing members are provided, some of these being referred to as the description proceeds.

Where irrigation is employed during the growing season, the vines grow in relatively deep furrows. To provide for vertical adjustment of the frame with respect to the supporting wheels, the wheels are mounted on stub axles 34. The inner ends of the axles 34 are welded to vertically extending plates 36. Coacting with the plates 36 are a pair of short angles welded to the rear lower outer faces of the frame 10. A set of bolts 40, passing through the plates 36 and a series of holes in the protruding leg of the angle 38, provide the required range of adjustment.

The peanuts are removed from the earth by the leading edge of the plow blades 42 passing through the earth at a depth calculated to pass below substantially all of the peanuts. It is sometimes more economical of power to permit a few of the peanuts to be lost. FIGURE 1 shows in phantom lines, the digging position of the machine. At the ends of the rows, when the machine is to be raised out of digging position, the parts are arranged as shown in the full lines of FIGURE 1. This machine is intended to be drawn with the conventional, three-point, hydraulic-lift type of tractor generally available in the United States. For a two row machine as illustrated, a model furnishing at least thirty horse power is considered necessary. Such tractors are provided with a pair of draft links 44 and a lift link 46. The draft links are connected to draft pins 48 supported by angle members 50 and welded with such members to the forward angle bar 16. A framework of converging bars 52, 54 and 56, arranged in pairs, join to form a yoke 58 through which a pin may be passed to connect with the lift link 46. As shown in FIGURE 1, to place the apparatus in digging position, the lift link 46 is moved forwardly and downwardly, while the motion is reversed to lift, the entire forward end of the frame pivoting about the axles 34.

The plow blades 42 have flanges 60 bolted at 62 to side plates 28. They are arranged to move forwardly in a substantially horizontal plane, sloping upwardly from front to rear. Some vertical adjustment of the blades may be had through the bolts 30 passing through the plates 28. Angular adjustment of the blades is obtained by means of the yoke 64 welded to the blade 42, the eye-bolt 66 connected to the yoke 64 and passing through the angle bar 16 and being fixed thereto by stop nuts 68.

As shown, the leading edge of the plow blades 42 is arranged to slice forwardly and angularly into the earth, lifting the soil to a depth of about six inches, according to the level at which the peanuts have been found to grow. The earth, as it moves rearwardly over the blades 42 passes over a series of longitudinal bars 70 toward the driven portions of the machine. If the soil is relatively moist and coherent, it will be moved bodily across the bars 70 while, if the soil is relatively dry and powdery, a portion of it will drop away from the mass and pass through the bars 70.

In order to prevent entanglement of the peanut vines with the plow blade suspension, a boot 72 is provided for each suspending apparatus. The boot 72 is a sheet metal housing extending vertically from the plow blade upwardly to a point just short of the connection of the eye-bolt to the frame, thereby leaving room for the adjustment of the nuts 68. On the inner sides facing each other, the two faces of the boots extend well back toward the bars 70 as shown while on the outer faces, the boots extend a lesser distance as shown. These shields may be bolted to the frame at points where the bolt heads cannot entangle the vines.

Immediately behind the rear ends of the bars 70 is the laterally extending beater 74. The beater is preferably formed of a shaft 76 to which are welded four plates 78 in box fashion; in turn, to the outer edges of plates 78 are welded bars or pipes 80. The ends of the shaft 76 pass through bearings mounted on the frame 10. The beater is made to revolve by means of gear 82 on the shaft 76 and by other means to be described below. The revolving motion of the beater serves to further advance upwardly and to the rear, the peanut vines, which have moved upwardly along longitudinal bars 70 from the plow blades 42. At the same time, the beater causes the earth around the peanuts to be broken up and loosened so that it will freely fall away from the clusters of vines and peanuts. In order to firmly strike the underside of the earth clods without exerting any pulling or tearing action upon the peanuts embedded in the clods, I have found the rounded striking portions 80 of the beater 74 to be especially effective. This construction delivers a continuing series of blows to the mass of vines and earth as it passes upwardly and rearwardly without affording any opportunity for entanglement of the vines or pulling of nuts from the vines.

To protect the outboard ends of the beater from entanglement with the peanut vines, fenders 84 are provided. These are fastened to the frame 10 at their forward ends by bolts entering the frame behind the trailing edges of the boots 72. The beater fenders extend rearwardly from the point of attachment and slant inwardly toward the rear in order to adequately exclude vines from access to the bearings of the beater 74. A semicircular cutout at the rear of the fender is located just outside the outermost path of travel of the beater bars 80. The upper portion 86 of the fender 84 is enclosed to complete the protection from this angle while the lower edge 88 of the fender extends to approach ground level when the apparatus is in digging position. Above and to the rear of fenders 84 are additional sheets 90 to further prevent entanglement of the vines and confine them to their proper area.

Extending upwardly and rearwardly of the frame 10 is the conveyor 92. At the lower end of the conveyor, the side angle bars 94 of the conveyor frame are pivotally mounted on the lower shaft 96, which in turn, has bearings fixed in the lower, rear portion of the frame. The conveyor also includes an upper shaft 98 and a pair of chains 100 guided by lower sprockets 102 on shaft 96 and upper sprockets 104 on shaft 98. It is desirable for the spread between the faces of the conveyor, as measured by the diameters of the sprockets 102 and 104 to be of the same order or larger than the orbit of the beater bars 80. This brings about smooth transfer of the vines from beater 74 to conveyor 92 whereas a smaller turning radius of the conveyor causes snatching of the vines with possible detachment of nuts from the vines. The conveyor flights proper are made up of bars 106 welded to brackets 108 attached to the conveyor chain 100. A number of teeth 110 welded to the bars 106, extend outwardly to engage the peanut vines without having entangling connection with the vines. The fingers 110 readily pick up the vines as they are advanced upwardly by the beater 74 and carrying the vines to the rear of the conveyor where the vines may drop cleanly off.

A pair of curved shields 112 protect the sprockets 102 from entanglement with the vines and another pair of shields 114 extend over the chain 100 for the same purpose. In order to permit adjustment of the rearward slope and height of the conveyor 92, a pair of brace bars 116 are bolted to the side bars 94 at 118 and to the frame 10 at 120. A plurality of bolt holes for the bolts 120 afford the means of adjustment. The conveyor is driven by chain 122, engaging sprocket 124 mounted on the rear shaft 98. An idler pulley 126 mounted on side bar 94 is provided for adjusting the tension in chain 122.

Power for driving the beater 74 and the conveyor 92 is derived from the power take-off 128 of the tractor 14. A shaft 130 extends through the universal joint 132 to a gear box 134 mounted on the intermediate plate 22 of frame 10. Extending laterally from the gear box 134 are shafts 136 journaled in bearings 138 mounted on the channels 14. A sprocket 140 on one of the shafts 136 drives chain 142 which drives sprocket 82 previously mentioned. Another sprocket 144 drives the conveyor chain 122.

Welded to each one of the side bars 94 of the conveyor frame and projecting rearwardly is a bar 146 for supporting a windrowing fork 158. The fork 158 is made up of a tubular sleeve 148 arranged to slide snugly over the bar 146. Through a boss 150 on the sleeve 148, a clamping screw 152 passes, enabling the fork element 158 to be adjustably fixed upon the bar 146. A series of tines 154 are welded to the sleeve 148 and, to strengthen the weld, an enlarged section 156, at the point of welding connection, may be employed. The method of mounting the forks 158 upon the bars 146 makes it possible to adjust the forks 158 in the direction of movement of the harvester. When the conveyor is operating slowly, the vines as they drop off the upper end of the conveyor tend to fall almost directly downward so that, if the forks are to be of value, they should be moved forwardly to break the fall of the vines. As the speed of the conveyor is increased, the vines tend to travel outwardly of the rear of the conveyor before falling appreciably, due to the inertia of movement. In such case, the forks 158 should be moved farther to the back of the apparatus.

Again, the rod and sleeve relationship of the mounting allows the two forks 158 to be moved toward and away from each other to regulate the width of opening between the respective rows of tines. If the tines are moved closely toward each other, the vines are dropped into a comparatively high, narrow windrow while if they are separated further the windrow is lower and broader. Adjustment may also be desirable depending upon the volume of vines dug up during the harvesting operation. Alternatively, the forks 158 may be entirely removed and other arrangements employed to deal with the vines, such as a box cart hitched behind the harvesting apparatus.

An important advantage of my method of dropping the vines from the rear of the conveyor is that the vines tend to be overturned during the conveying operation so that they drop to the ground with the uprooted peanuts uppermost and the tops of the vines adjacent the ground. In this way, the moisture in the nut shells, resulting from the growth in damp soil, tends to dry out of the nuts more effectively as they lay in the windrows exposed to the sun.

I claim:

1. A peanut digger including a frame, at least one transport wheel mounted on each side thereof, a digging blade mounted forwardly of the frame for passage of the leading edge thereof beneath the growth level of the peanuts, means coacting with the frame and blade for adjusting the digging depth of the blade, a rearward and upwardly traveling endless conveyor arranged to receive peanut vines uprooted by the digging blade and means located between the rear portion of the digging blade and the forward portion of the conveyor for transferring the peanut vines from the blade to the conveyor, comprising a rotatable beating member extending horizontally of the frame in advance of the lower, forward turning axis of the conveyor, said beater member including a plurality of striking edges, each extending uninterruptedly the length of the beater axis and substantially parallel thereto.

2. The digger of claim 1 wherein said beating member revolves on a horizontal axis in advance of the lower, forward turning axis of the conveyor, the sense of rotation of said beater advancing the uprooted vines upwardly toward the conveyor.

3. The digger of claim 1 wherein the striking edges are rounded on a smaller radius of curvature than radius of the path in which said edge moves about the axis.

4. The digger of claim 1 including longitudinally extending fender members for each end of the beater, the forward portion of said fenders being fixed to the frame in advance of the axis of rotation of the beater, said fenders extending rearwardly and angularly inward toward the center portion of said beater.

5. The digger of claim 1 wherein said conveyor is open, having a plurality of spaced cross-members, each such cross-members being provided with a plurality of outwardly extending, vine-engaging points.

6. The digger of claim 5 wherein said cross-members are supported between a pair of sprocket-driven chains supported for movement on said frame at each side thereof and shrouding extending over said chains and sprockets inwardly toward said cross-members, to prevent entanglement of vines with said chains and sprockets.

7. The digger of claim 1 wherein the angle of tilt of the conveyor may be adjusted by raising and lowering the upper, rear turning axis of the conveyor.

8. The digger of claim 1 wherein the beater member includes a plurality of baldes extending generally radially outward of the axis of rotation to terminate in said striking edges, said blades having a smooth continuous surface.

References Cited in the file of this patent

UNITED STATES PATENTS

| | | |
|---|---|---|
| 1,321,326 | Percivall | Nov. 11, 1919 |
| 2,562,659 | Carter et al. | July 31, 1951 |
| 2,597,218 | Appel | May 20, 1952 |
| 2,669,820 | Falkner | Feb. 23, 1954 |
| 2,722,794 | McGee | Nov. 8, 1955 |
| 2,773,343 | Oppel | Dec. 11, 1956 |